(12) United States Patent
Asami et al.

(10) Patent No.: US 6,594,669 B2
(45) Date of Patent: Jul. 15, 2003

(54) METHOD FOR QUERYING A DATABASE IN WHICH A QUERY STATEMENT IS ISSUED TO A DATABASE MANAGEMENT SYSTEM FOR WHICH DATA TYPES CAN BE DEFINED

(75) Inventors: Masato Asami, Sagamihara (JP); Youichi Yamamoto, Machida (JP); Tomoto Shimizu, Yokohama (JP); Yoshito Kamegi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/140,103

(22) Filed: May 8, 2002

(65) Prior Publication Data

US 2002/0123991 A1 Sep. 5, 2002

Related U.S. Application Data

(63) Continuation of application No. 09/392,621, filed on Sep. 9, 1999, now Pat. No. 6,434,554.

(30) Foreign Application Priority Data

Sep. 9, 1998 (JP) .......................................... 10-255058

(51) Int. Cl.[7] .............................................. G06F 17/30
(52) U.S. Cl. ................................ 707/101; 707/3; 707/2; 707/5; 707/4
(58) Field of Search ............................... 707/3, 2, 103, 707/4, 101, 100, 102, 9; 709/203, 201; 345/853, 968; 711/117

(56) References Cited

U.S. PATENT DOCUMENTS

| 5,201,046 A | 4/1993 | Goldberg et al. ............... 707/3 |
| 5,608,904 A | 3/1997 | Chaudhuri et al. ............. 707/2 |
| 6,012,067 A | 1/2000 | Sarkar ......................... 707/103 |

*Primary Examiner*—Jean M. Corrielus
(74) *Attorney, Agent, or Firm*—Antonelli, Terry, Stout & Kraus, LLP

(57) ABSTRACT

A newly defined data type is added to a database management system. Information about a query component assisting in querying data belonging to the newly defined data type is registered along with data type information in a query component information. If the data type being queried is the newly added data type, the query component information is searched to find a query component for assisting queries to data belonging to the particular data type. The matching query component is activated and a screen is displayed to input information needed to the query data belonging to the data type. The information is input and a query statement is generated using the inputted information. The generated query statement is issued to the database management system and query results are obtained.

2 Claims, 15 Drawing Sheets architecture of WWW query device

Hardware architecture of query device

Relationship between data types in database and query components

Structure of query component information

Flowchart of query editing

Flowchart for display of search condition input screen

FIG.9

Sample query component information

| component information 601 | | data type 602 | function category 603 |
|---|---|---|---|
| name 1110 | run module 1111 / run name 1112 | | |
| Simple | input / Sgml | SGMLText | search condition input 1101 |
| Simple | view / Sgml | SGMLText | display |
| Seed | input / Image | Image | search condition input |
| Thumb Nail | view / Image | Image | display |
| Advanced | input / Sgml | SGMLText | search condition input 1105 |

Flowchart of operations for setting up of search result screen

WWW Hardware architecture

FIG.15  architecture of WWW query device structure of conventional query device

METHOD FOR QUERYING A DATABASE IN WHICH A QUERY STATEMENT IS ISSUED TO A DATABASE MANAGEMENT SYSTEM FOR WHICH DATA TYPES CAN BE DEFINED

The present application is a continuation of application Ser. No. 09/392,621, filed Sep. 9, 1999, now U.S. Pat. No. 6,434,554, the contents of which are incorporated herein by reference.

BACKGROUND OF THE INVENTION

The present invention relates to a database querying method for querying databases. More specifically, the present invention relates to a technology that can be implemented effectively for a database querying method that queries databases in which newly added data types can be stored, e.g., object relational databases.

Queries to databases are performed using query languages provided by database management systems (DBMS). In relational databases, which are widely used, the query language is generally SQL (Structured Query Language), which is an international standard.

When querying a database, an application program must be developed in order to issue query statements expressed in a query language and to obtain the query results. Development of this application program, however, requires specialized knowledge of the database and language and involves substantial effort. For this reason, query devices are provided to allow interactive querying of databases.

In a simple query device, query statements expressed in a query language are inputted directly, and the query results are displayed as strings or numerals. Using this type of query device requires knowledge about the database management system being queried and the query language thereof.

To allow easier query of databases, there are also query devices that use a visual interface to allow interactive querying of a database. This type of query device can display tables and rows to be queried by obtaining them from the database and can also display lists of functions and operators reserved by the query language for use in search conditions for these tables and rows. The user making the query selects desired elements from the displayed lists and builds a query by combining these elements. The query results are displayed as strings and numerals. This allows databases to be queried easily even without a thorough understanding of the database management system or the query language thereof.

FIG. 16 is a drawing showing a sample architecture of a conventional query device, A database management system 100 interprets and executes a query statement expressed in a query language, and the query results (retrieved data) are returned as strings and numerals Information relating to tables and rows from the database (database information) can also be results for special queries.

A query device 150 issues query statements to a database management system 100 and acquires query result data and database information.

A query execution control module 101 controls the various modules in the query device 150 and coordinates data being passed between modules. A query input module 102 displays operators and functions defined by the query language and a list of information relating to tables and rows from the tables acquired from the database in order to build query statement. The query input module 102 also provides an interface for selecting and combining these elements and handles query input.

A query results output module 103 displays strings and numerals from query query statement generation module 104 uses the information from the query input module generate query statements. A database access module 105 is a database driver that connects to the database management system 100, issues the query statements generated by the query statement generation module 104, and retrieves data.

With advances in hardware and the growth of the WWW (World Wide Web), the field of database management is seeing a demand for management of databases containing multimedia data such as documents and images. Thus, there is a need to provide features for defining and managing complex data that could not be handled using the methods of conventional relational database management.

Object relational databases have been made available to extend relational databases to provide expanded handling of data models and allow complex abstract data type definitions.

Abstract data types allows data structures to be defined along with accessing operations of these structures in the form of methods. By limiting data structure access to the defined methods, the data structures can be hidden. Thus, the behavior of complex data can be defined in a safe manner, and complex queries can be issues for the data. Furthermore, systems in which these methods work with external modules can provide high-level data operations.

SQL3, which is currently being standardized, defines specifications for use-defined types including abstract data types. Multimedia data can be managed in a database according to standards by using these user-defined types to define multimedia data in a database.

In conventional query devices, queries can be performed for string and numerical data that have been pre-defined in the database management system, but data types that have been newly defined in the database cannot be queried.

With string and numerical data, the database management system clearly defines data processing methods, e.g., the types and meaning (use) of operators, data structures, and display methods. Thus, the query device can provide query functions based on these definitions. However, with newly defined data types, the definitions themselves can be obtained but it is not possible to determine how the data is to be processed.

For example, in order to manage structured documents with a database, a new structured document type is defined in the database. This structured document type provides the database with features such as the ability to perform high-speed searches of a specified string on specified structures in the document and the ability to embed information in documents to highlight strings that match search conditions.

However, for newly added structured document type data, conventional query devices, do not have information about that kinds of searches that can be performed as well as what to retrieve as the search results and how to display these results. Thus, queries cannot use features specific to the structured document type (full-text search of specified structure and highlighted display).

Implementing queries that use these features requires the development of an application program to issue these queries. The development of this application program will require a deep understanding of the structured document type in addition to an understanding of the query language such as SQL and access methods for the database.

Also, generating query statements to be issued to the database management system requires a knowledge of the specifications of the methods provided by the structured document type as well as the meaning of the parameters to the method (e.g., the specifications of the query language for full-text searches and options for full-text searches). Not only must the methods used to acquire data be understood to display the data, but operations to interpret and display the format of the data returned by the method must also be designed.

When a new data type is added to the database, conventional query devices cannot be used to query this data type. In order to perform querying, effort must be expended application program that manipulates the data type. This type of problem will come up each time a new data type, such as images or maps, is added to the database.

SUMMARY OF THE INVENTION

The object of the present invention is to overcome the problems described above and to provide a technology that allows data types newly added to a database to be queried in as conventional data types without requiring specialized knowledge of the data type. activated to assist in querying data belonging to the particular data type.

The present invention provides a method for querying a database in which new data types can be defined where query statements are issued and query results are obtained. When querying data belonging to a newly defined data type, a query component for assisting in the query is activated to assist in querying data belonging to the particular data type.

In the present invention, when a new data type is defined in the database management system, information relating to a query component for assisting queries of data belonging to the newly defined data type, along with information about the data type, is registered in a query component information.

When a query to the database management system is inputted in the database query device, the data type being queried is evaluated to see whether it is a newly added data type or not.

If the data type being queried is a newly added data type, the query component information is searched for a query component for assisting querying data belonging to the particular data type.

When the query component for assisting querying of data belonging to the data type is found, the found query component is activated and a screen is displayed for entry of the information needed in querying data belonging to the data type.

The user inputs the information needed to query the data belonging to the screen. The database query device generates a query statement using the entered information. The generated query statements are issued to the database management system and query results are retrieved.

With the database querying method according to the present invention as described above, if a data type being queried is a newly defined data type, a query component is activated to assist in the entry of the information needed for querying When a new data type is added to the database, querying can be performed in the same manner as with conventional data types even without specialized knowledge about the data type.

BRIEF DESCRIPTION OF THE DRAWING

FIG. 9 is a drawing showing an example of the, query component information, to the first embodiment.

DESCRIPTION OF THE PREFERRED EMBODIMENTS (Embodiment 1)

The following is a description of a database query device according to a first embodiment in which a database management system is queried via a network.

In this embodiment, "querying" refers to issuing instructions to a database management system to perform data manipulations such as searching data, retrieving data, inserting data updating data, and deleting data. A "query statement" refers to a string that can be interpreted as a data manipulation instruction, as described above, by the database management system. The system for these strings is referred to as a query language, for which SQL, an international standard, is widely used. In this embodiment, queries to the database will be described primarily in the context of data searches, including data retrieval. However, this embodiment is not restricted to data searches and can be applied to all the query operations described above.

Figure 1:
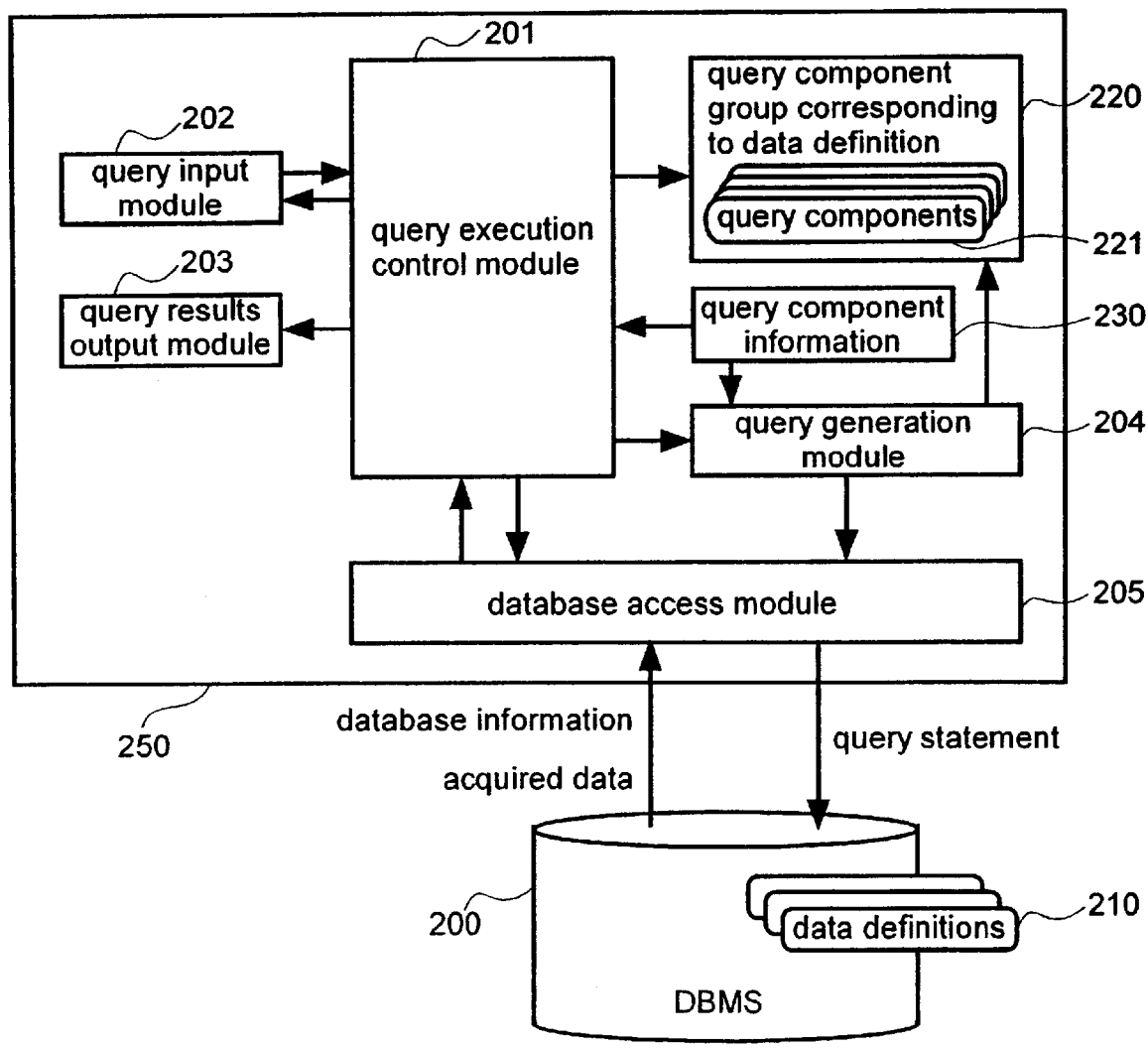
FIG. 1 is a schematic drawing showing the architecture of a database query device according to a first embodiment.

FIG. 1 is a schematic drawing showing the architecture of a database query device according to this embodiment.

A database management system 200 can handle user-defined types. A user-defined type is a concept that includes abstract data types and to be defined along with data structures.

Data definitions 210 represents user-defined type definitions and implementations (programs) thereof. An example of a user-defined type is a structured document type such as SGML (Standard Generalized Markup Language) defined along with a function for performing full-text searches of specified structures in the structured document, a function for marking strings fulfilling the search conditions from the full text search, and the like In addition, image types and map types that require complex search functions are possible.

These functions of the user-defined types can be called by the query language as methods. Methods can be specified using the query language, and it would also be possible to call external modules.

The database management system 200 receives query statements containing a method for a user defined type and retrieves data and database information (information about tables and rows from tables) as the results of the query.

A query device 250 of this embodiment includes a query execution control module 201 controlling the over-all flow of operations in the query device 250; a query input module 202; a query results output module 203; a query statement generating module 204; a database access module 205, a query component group 220, and a query component information 230.

The query component group 220 is a set of query components 221 corresponding to the data definitions 210 of data types that have been newly added to the database management system 200. The query components 221 are components for querying the data defined by the data defined by the data definitions 210 and include components for interfaces used to input information needed to perform queries, components for generating query statements based on the inputted information, and components for processing and displaying data needed for outputting the retrieved data as the query results. These query components 221 are provided when the data definitions 210 are added to the database. The query components 221 are installed in the query device 250 based on querying requirements.

Information relating to the query components 221 used to assist queries of newly defined data types in the database management system 200 is registered in the query component information 230 along with information about the data type. The query component information 230 keeps track of the types of query components 221 installed in the query device 250 for different data types. When a query component 221 is installed, it is registered in the query component information 230.

If the data type to he queried is a data type that has been newly added, the query execution control module 201 searches the query component information 230 for the query component 221 that assists querying for the data type. The query component 221 is activated and a screen is displayed to allow entry of the information needed for querying the particular data type. The information is entered using the query input module 202.

The query input module 202 provides an interface for performing interactive querying. The query results output module 203 outputs the retrieved query result data according to the query result output specifications entered in the query input module 202.

The query statement generating module 204 uses the query information entered via the query input module 202 to generate a query statement to be issued to the database management system 200.

The database access module 205 is a database driver that connects to the data management system 200, issues query statements generated by the query statement generating module 104, and obtains query results.

A program is recorded on a recording medium such as a CD-ROM to allow the query device 250 according to this embodiment to provide the functions of the query execution control module 201, the query input module 202, the query results output module 203, the query statement generating module 204, and the database access module 205. The program is stored in a magnetic disk device or the like and then loaded in memory and executed.

Figure 2:
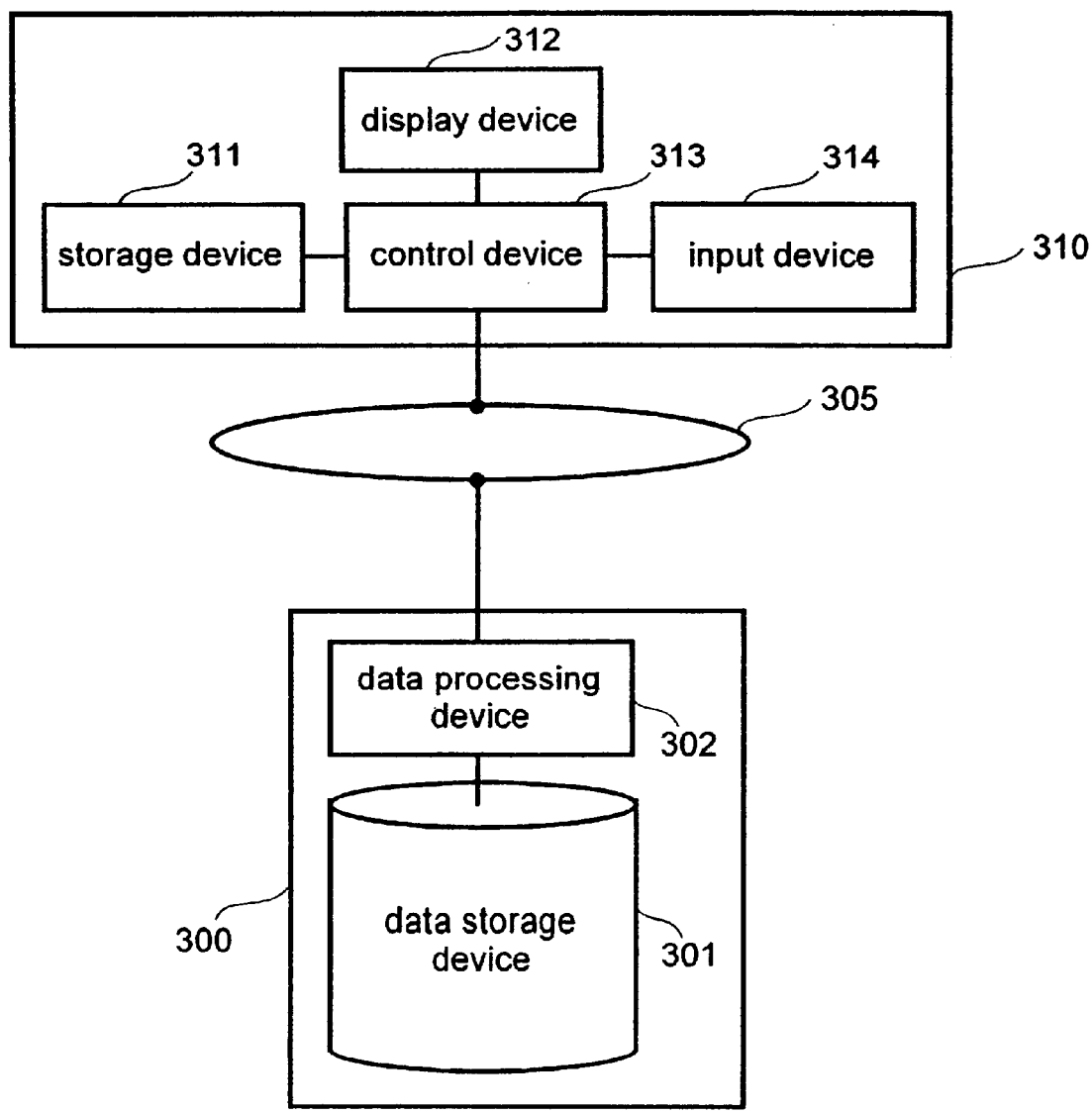
FIG. 2 is a drawing showing the hardware architecture of a query device 250 shown in FIG. 1 according to the first embodiment.

FIG. 2 is a drawing showing the hardware architecture of the query device 250 described with reference to FIG. 1. A query device 310 is connected to a database management system 300 through a network 305. The network 305 can also be connected to a plurality of query devices 310 and a plurality of database management systems 300. It would also be possible to have the query device 310 connected directly to the database management system 300 without going through the network 305.

The database management system 300 includes a data processing device 302 that interprets the query language and manipulates data and a data storage device 301 that stores information relating to the database such as data, tables, and rows (including information related to extended data types).

The query device 310 includes a storage device 311, a display device 312, a control device 313, and an input device 314.

The storage device 311 stores query component information 230. The input device 314 allows selection of a query component 221 and database information such as tables and rows, entry of query information, and entry of instructions for the query device 310 and the database. The display device 312 displays information used to edit queries as well as results from queries. The control device 313 controls the connection with the database, generates query statements using the entered query information, issues queries to the database management system 300, acquires query results, and controls the display device 312 so that it acquired query results.

Figure 3:
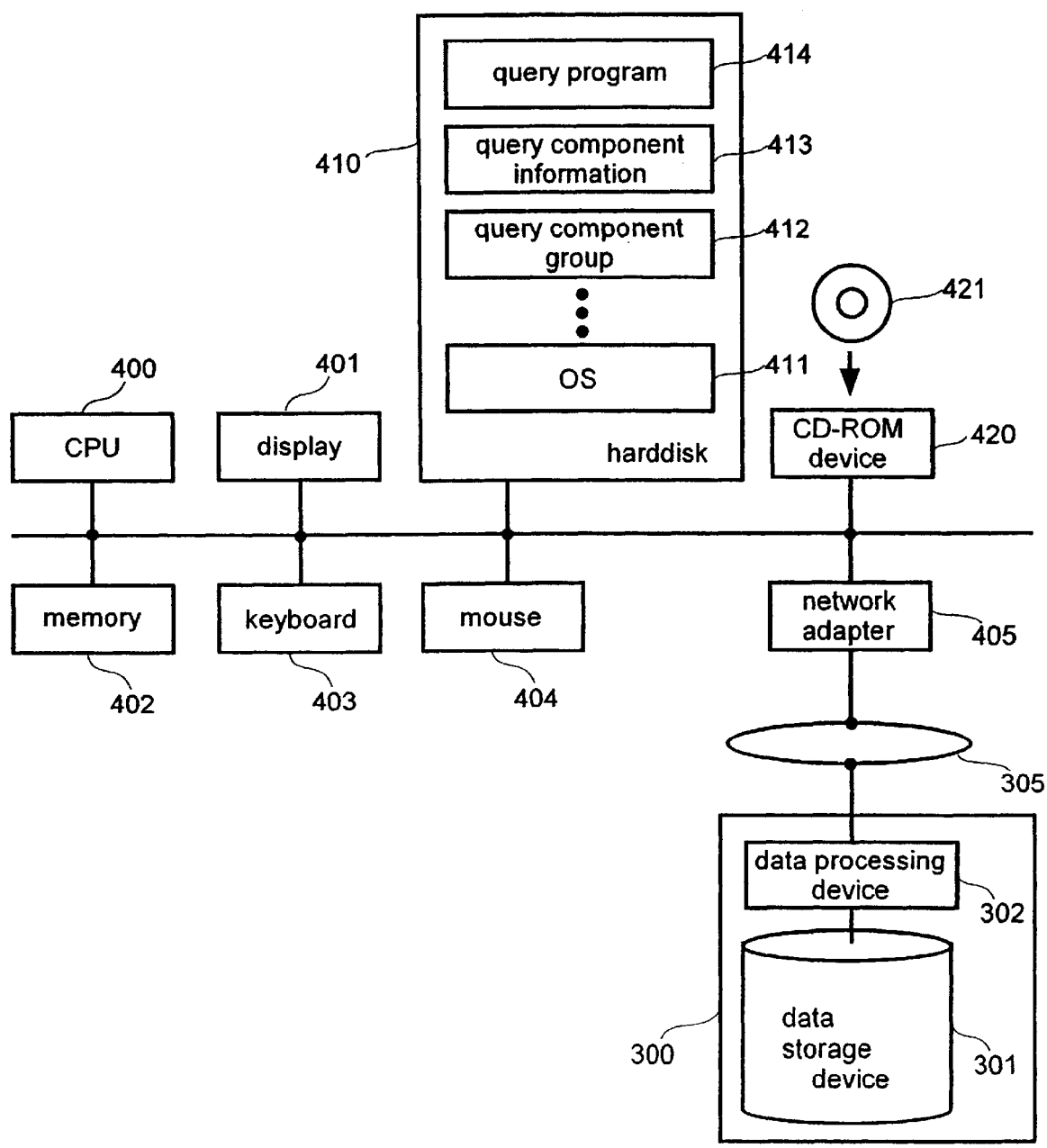
FIG. 3 is a drawing showing a hardware architecture in which a CPU is used for a control device 313 in the database query device from the first embodiment.

FIG. 3 is a drawing showing a hardware architecture in which a CPU is used for the control device 313 formed from hardware logic devices rather than a CPU 400.

In FIG. 3, the CPU 400 as connected to a memory 402, a display 401, a keyboard 403 a mouse 404, a hard disk 410, a CD-ROM device 420, and a network adapter 405. The network adapter 405 is connected via the network 305 to the network node in the form of the database management system 300.

The hard disk 410 stores an operating system 411, a query component group 412, a query component information 413, and a query program 414. The query component group 412, the query component information 413, and the query program 414 are installed from a CD~ROM 421 using the CD-ROM device 420.

The query component group 412 can be stored anywhere where it can he activated or run 5 by the query program 414. Thus, it does not have to be on the same hard disk. The query component information 413 can also be stored anywhere where it can be accessed by the query program and where information can he registered during installation of the query component group 412. Thus, this information does not need to be on the same hard disk either, Furthermore, this information can be stored in a registry or a database rather than in a file system.

Figure 4:
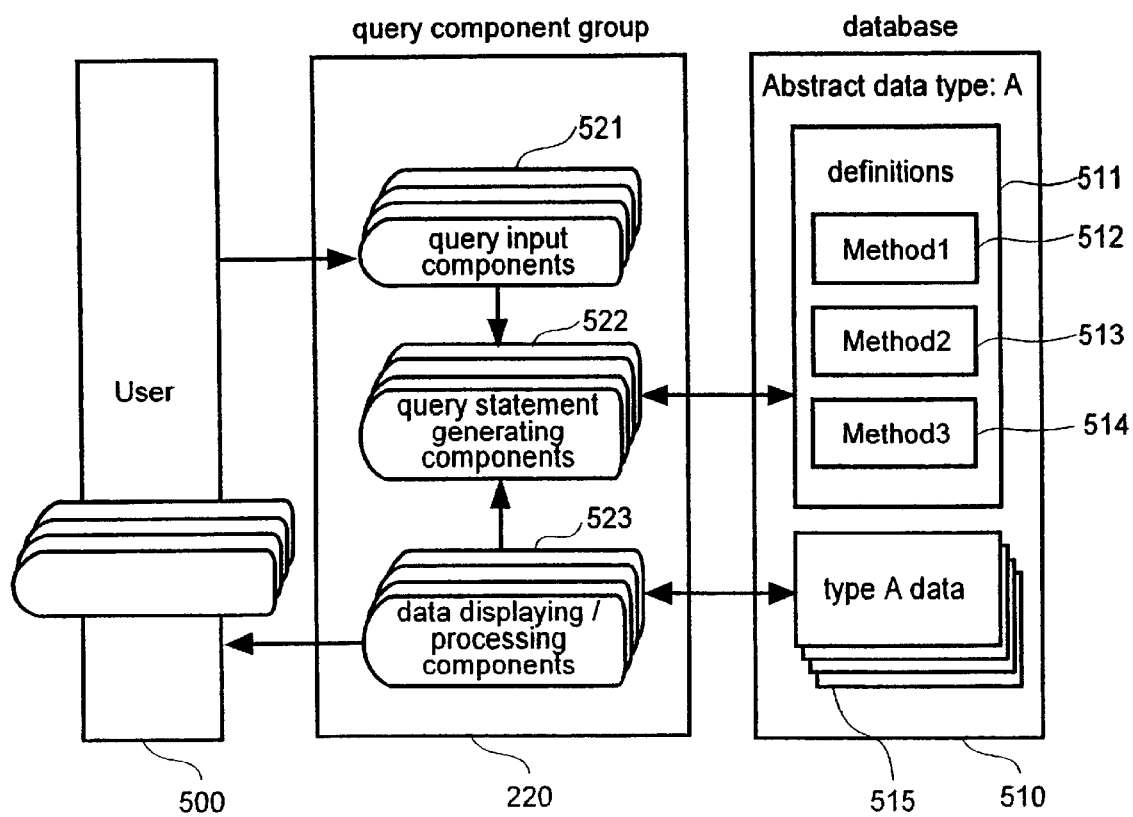
FIG. 4 is a drawing showing the relationship between the data types in the database and the query components in the database query device according to the first embodiment.

FIG. 4 is a drawing that shows the relationship between the query components and the data types in the database of the database query device according to this embodiment. An abstract data type 510, defined in the database with the name "A", serves as an example of an added data type.

In a definition 511 for the A type, methods Method1, Method2, and Method3 are defined. Queries specific to the A type can be performed by using these methods in queries. These methods can be expressed using a query language or can involve calls to external modules.

A type data 515, i.e., A type values, are stored in the database according to the definition 511 for the A type. The methods in the A type definition 511 access the A type data 515.

A user 500 is a user querying the A type data 515.

The query component group 220 for the A type serves to bridge the gap between the user 500 and querying operations performed on the abstract data type 510. The query component group 220 provides various operations needed to perform queries on the A type.

A query input component 521 is a component that provides assistance for entry of the information needed to query the A type data 515. A data displaying/processing component 523 is a component that outputs the data acquired as the results from the query in a form that can be recognized by the user 500.

A query statement generating component 522 is a component that generates a query statement based on query information entered using the query input component 521 and methods activated by the data displaying/processing component 523 for obtaining data.

The query statement generated by the query statement generating component 522 does not have to be the query issued to the database management system 200 and can be used as just one of the syntactical elements in the query language. The syntactical element of the query statement generated by the query statement generating component 522 is converted to a complete query statement by the query statement generating component 204 from FIG. 1 and issued to the database management system 200.

In FIG. 4, the query input component 521, the query statement generating component 522, and the data displaying/processing component 523 are shown as separate component. This is based on functional classifications, but in the actual implementation multiple functions can be performed by a single component. These query components 221 can take different form as long as they can be activated or run from the query device 250.

Figure 5:
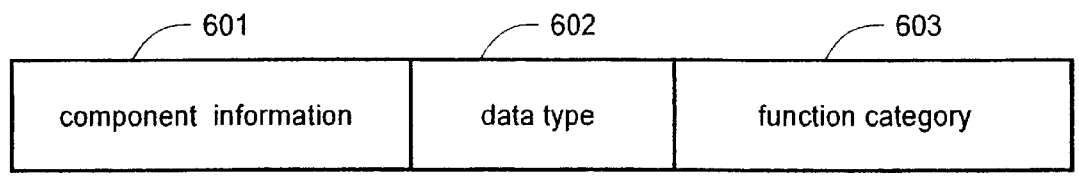
FIG. 5 is a drawing showing the architecture of a query component information 230 according to the first embodiment.

FIG. 5 shows the architecture of a query component information 230 according to this embodiment. The query component information 230 includes a component information 601, a data type 602 of the data in the database corresponding to the query component 221, and a function category 603.

The component information 601 contains information needed for activating or running the query components 221 as well as information to help the query user to select an appropriate query component 221 as well as information to help the query user to select an appropriate query component 221. The function category 603 stores code indicating how the component is to be used in a query. The types of codes can be categorized as: search condition input, aggregate function, data acquisition, display and data processing.

Figure 6:
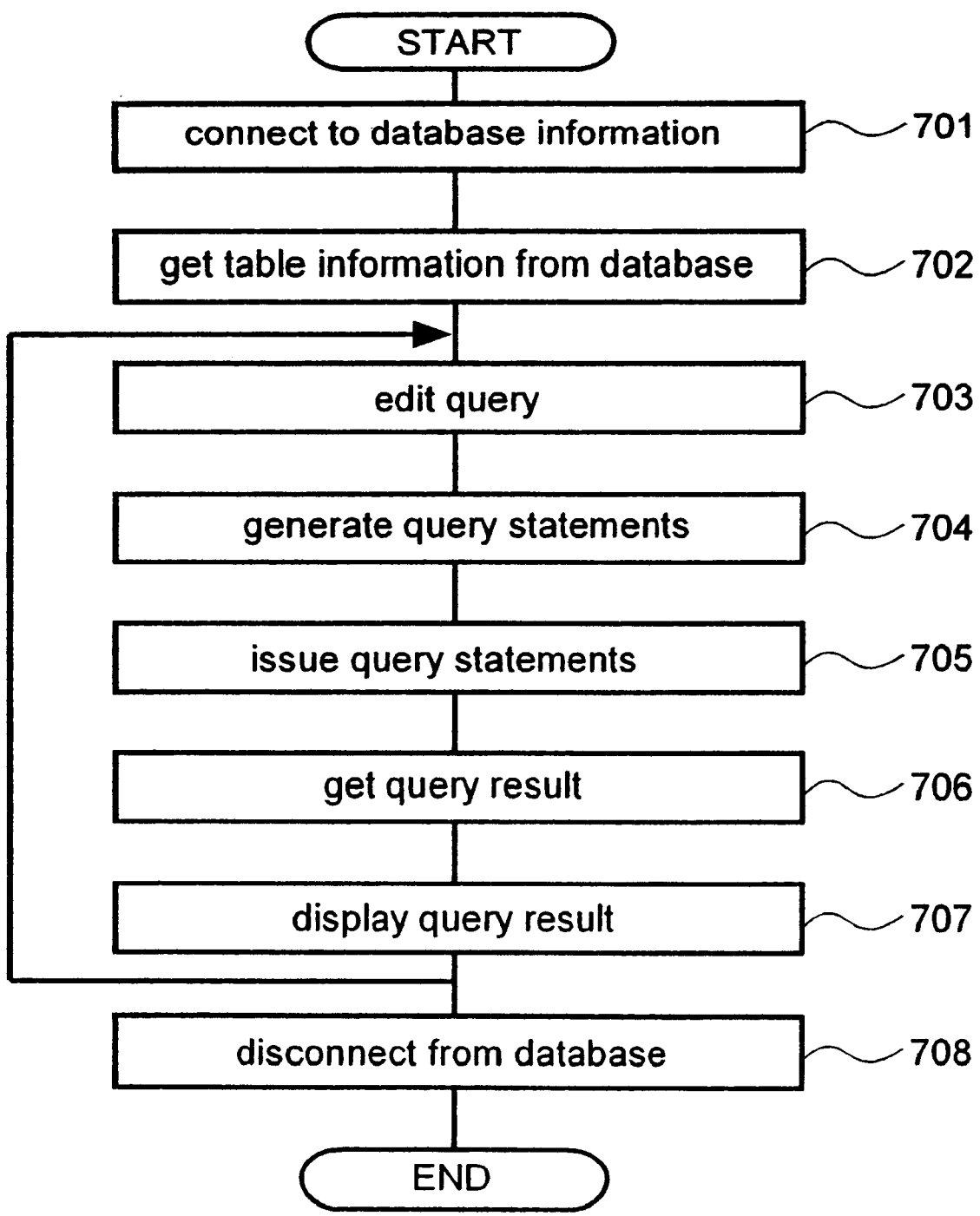
FIG. 6 is a flowchart showing the operations performed in querying the database using the query device 250 according to the first embodiment.

FIG. 6 is a flowchart showing the sequence of operations involved in performing database queries using the query device 250 according to this embodiment. The following is a description of the operations of the query device 250, with reference to the figure.

First, the query device 250 is started and connected to the database management system 200. This is performed by having the query user explicitly specify a database name and a user name (701).

A database dictionary is searched and table information is retrieved (702). Next, a query is edited (703). A detailed description of this step will be 'provided later. With the query editing operation, syntactical elements of a query statement for a search condition on a data type or a projection row for retrieving data are generated. These are combined to create complete query statements (704).

The generated query statements are issued to the database management system 200 (705), and the database management system 200 analyzes/executes the query statement and returns query result data.

The query device 250 uses functions such as the cursor functions of the database and retrieves query result data (706). The acquired data is displayed (707) according to the query results display settings set up in the query editing operation (703). If a query component 221 for displaying is specified, the component is activated or executed and displaying is performed.

If another query is to be executed, control returns to step 703. If no more queries are needed, the database is disconnected and the query device 250 is terminated (708).

Figure 7:
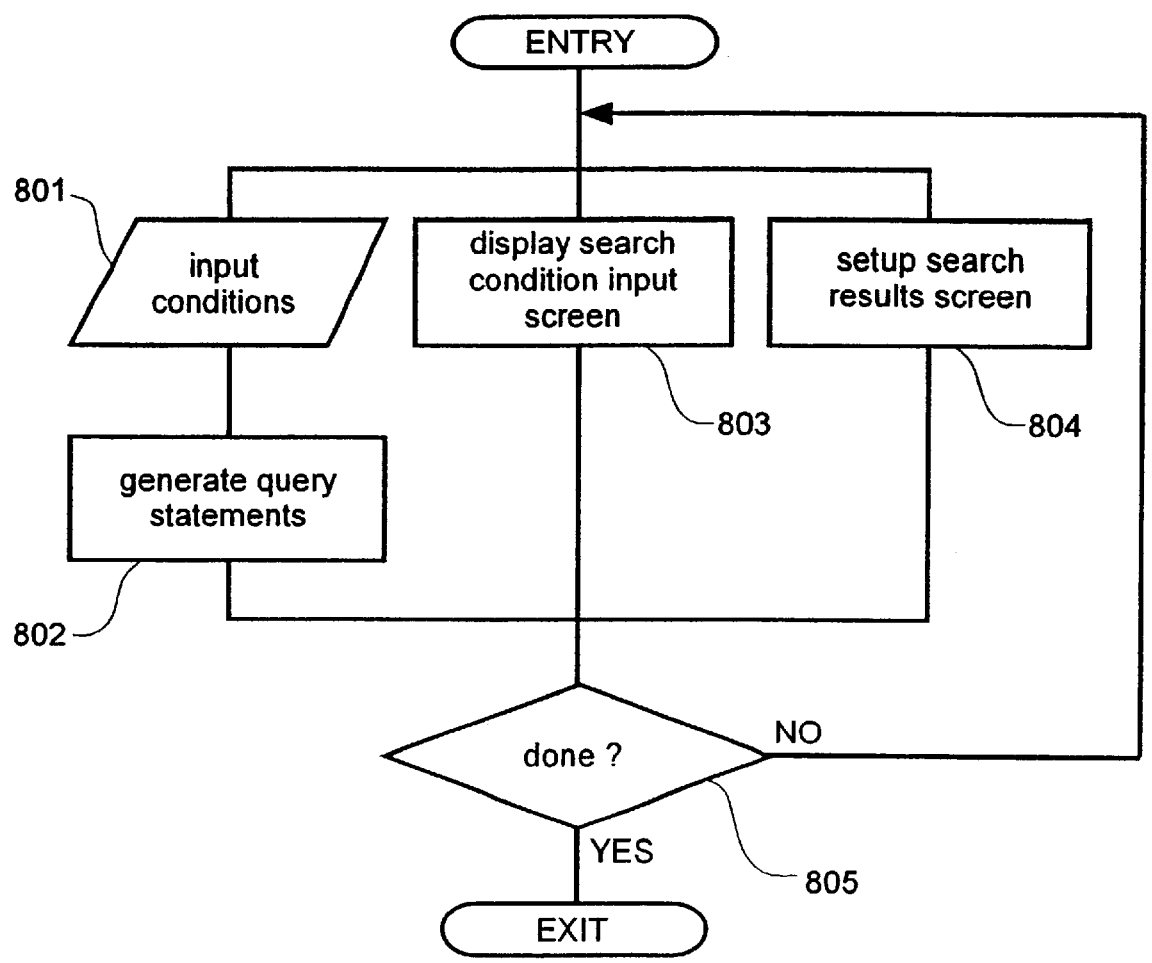
FIG. 7 is a flowchart showing the operations performed in editing a query at step 703 from FIG. 6 according to the first embodiment.

FIG. 7 is a flowchart showing the operations performed when editing a query in step 703 from FIG. 6 according to this embodiment. Query editing takes place in an interactive environment, where displaying and input operations are repeated until the editing is completed at step 805. More specifically, the following operations are repeated: displaying a search conditions input screen (803); setting up a search results screen (804); inputting query conditions into the search condition input screen (801); and generating a conditional expression (802).

Figure 8:
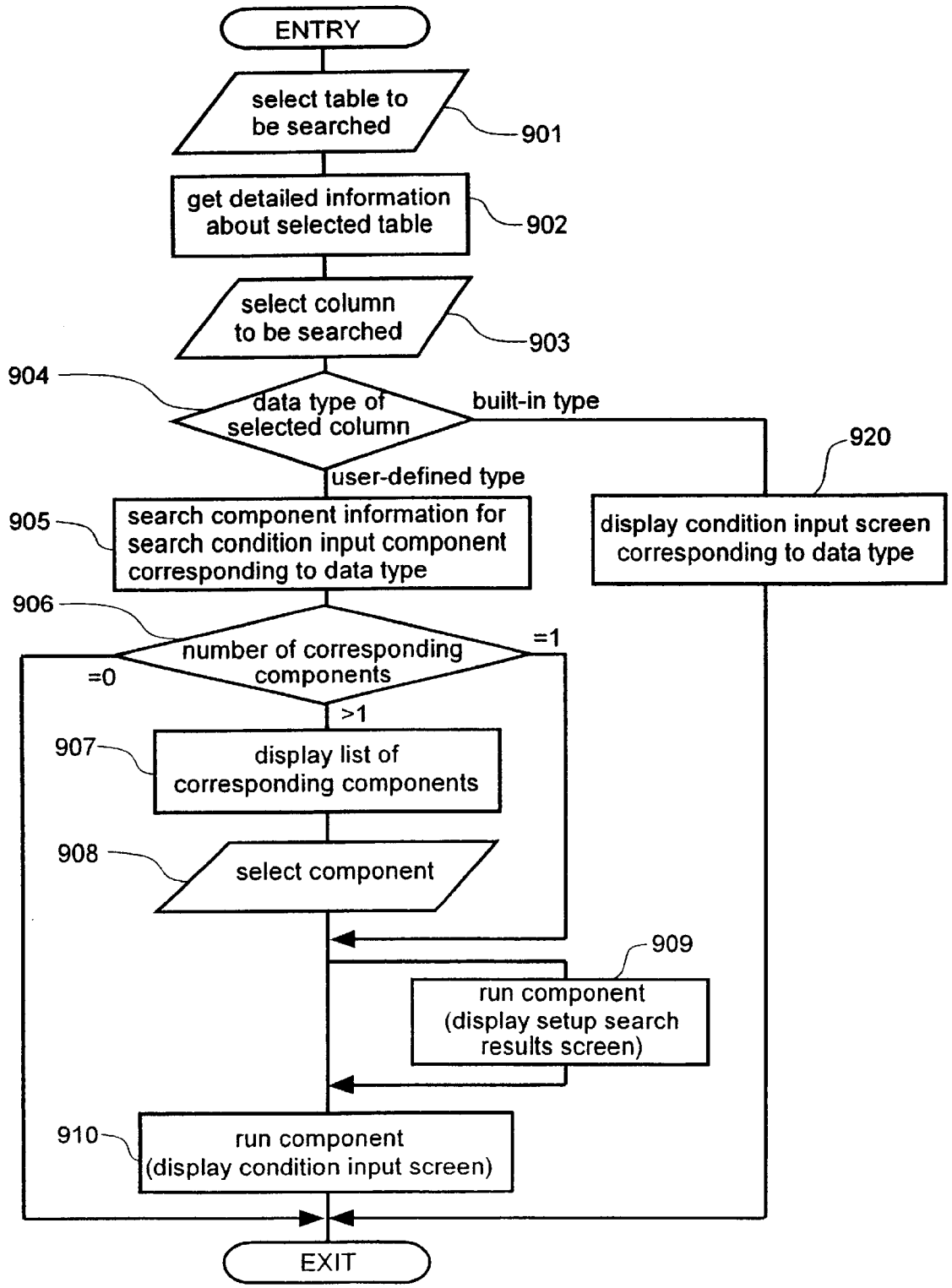
FIG. 8 is a flowchart showing the operations performed in displaying a search input screen at step 803 from FIG. 7 according to the first embodiment.

FIG. 8 is a flowchart showing the operations involved in displaying the search condition input screen from step 803 in FIG. 7 according to this embodiment. A table list is generated and displayed based on database table information retrieved at step 702. The query user selects a table to query out of the table list (901).

Row names of the selected table and the data types thereof are acquired from the database (902), and a list of these items is displayed. The query user selects a row to query (903).

The data type of the selected row is examined (904), and if the row is of a data strings, numerals, or the like, that has been pre-set in the database, then the search condition screen corresponding to the strings, numerals, or the like is displayed (920). This operation is identical to what is performed by the conventional query device 150.

If the data type of the selected row is a user-defined type, then the query component information 230 is searched to find a query component 221 having search condition input functions for that particular data type. For this, the data type 602 and the function classification 603 of the query component information 230 from FIG. 5 is used.

If the search finds no query component 221 that provides search condition input functions for the particular data type (906), then conditions for the selected row cannot be entered and the display operations for the search condition input screen are terminated. If, at step 906, multiple query components 221 having functions for search condition input of the particular data type are found (i e, the number of components matching the condition is greater than 1), then a list of these components is displayed (907). The query user selects an appropriate component from the list displayed at step 907.

If, at step 906, only one query component 221 is found to have a search condition input function for the particular data type, the component is activated. If a component is selected at step 908, the selected component is activated. A search condition input screen provided by the component is displayed to output a screen allowing entry of search conditions containing the particular data type (910).

If the search condition input screen provided by the component is to he customized, the search condition input screen provided by the component is displayed and customization is performed (909).

The following is a description of the operations performed from step 905 onward when the data type of the selected row is SGMLText.

FIG. 9 is a drawing showing sample query component information 230 for this embodiment, The component information 601 includes a name 1110, which serves as information used by the query user to identify components, and a run module 1111 and a run name 1112, which are needed 10 for actually activating the component. The information required for activating the component is dependent on the environment in which the query component 221 is to be executed.

If the row selected for search condition input is SGMLText, the query component 221 are searched for a component in which the data type 602 is SGMLText and the function category 603 is search condition input. In the example shown in FIG. 9, the query component 221 in the component information field 1101 with the name field 1110 set to "Simple" and the query component 221 in the component information field 1105 with the name field 1110 set to "Advanced" are selected. Since the corresponding component count is 2, these components are displayed as a list.

Figure 10:
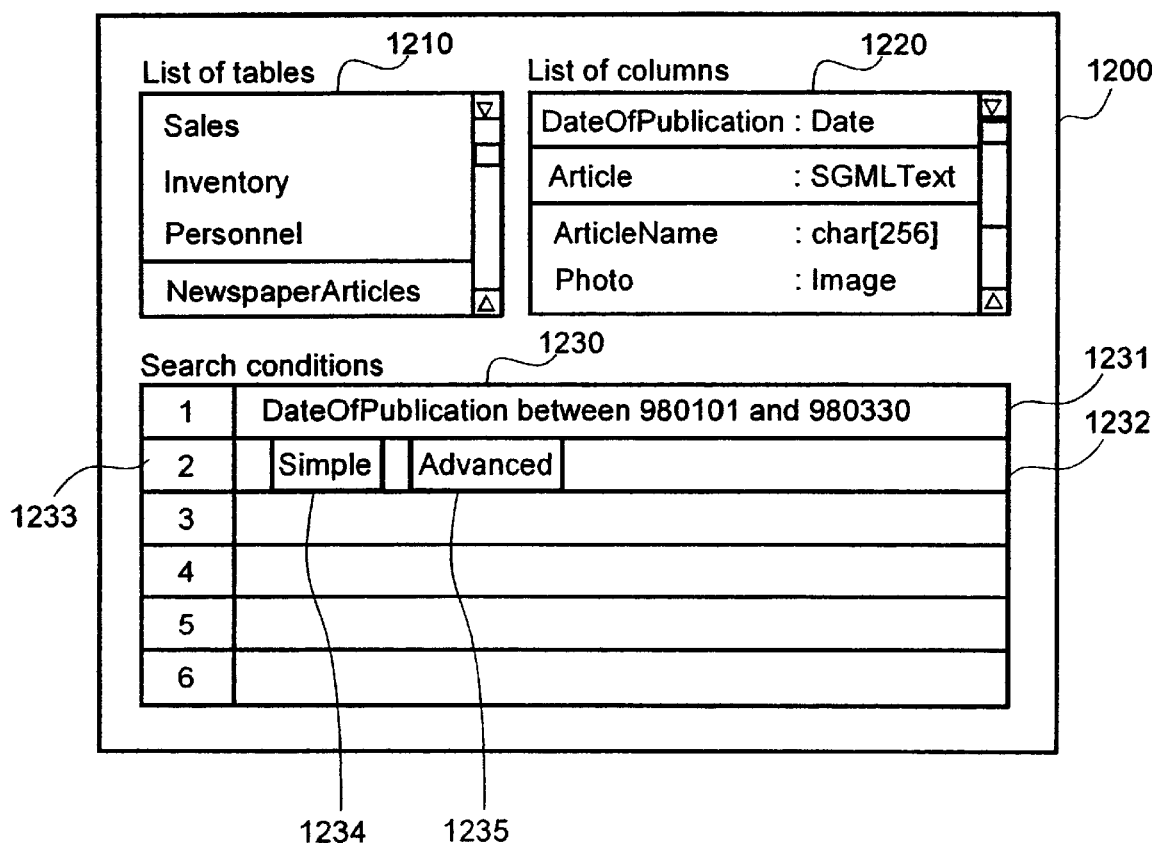
FIG. 10 is a drawing showing an example of a search condition input screen displaying a list of components according to the first embodiment.

FIG. 10 is a figure showing a sample search condition input screen displaying a list of components according to this embodiment. A screen display 1200 is a screen that serves as a basis for the search condition input screen. A table list 1210 displays a list of tables in the in the connected database. The "Newspaper Articles" table is selected (step 901). A row list 1220 shows a list of rows in the table called "Newspaper Articles" selected in the table list 1210, with "Article: SGMLText" selected (step 903). In this case, "Article" is the name of the row and "SGMLText" is the data type of the row.

Search condition input fields 1230 are a series of fields in which search conditions are inputted. The query user selects a field and enters a search condition. In FIG. 10, the second field is selected and a search condition corresponding to the "Article" row selected from the row list 1220 is entered. "Simple" and "Advanced", which are the query components 221 used for search condition input for the SGMLText type, are displayed as a "Simple" button 1234 and an "Advanced" button 1235 (step 907). In this example, components are displayed using lists and buttons, but it would also be possible to use other methods such as menus and palettes with icons. Also, a search condition corresponding to a "Date of Publication" row is already inputted in an input field 1231.

The query user selects "Simple" from the list (pushes the "Simple" button 1234), and the selected query component 221 is executed using the run module 1111 and the start-up name 1112 in the query component information 230 from FIG. 9. As a result, a screen similar to the one shown in FIG. 11 is displayed.

Figure 11:
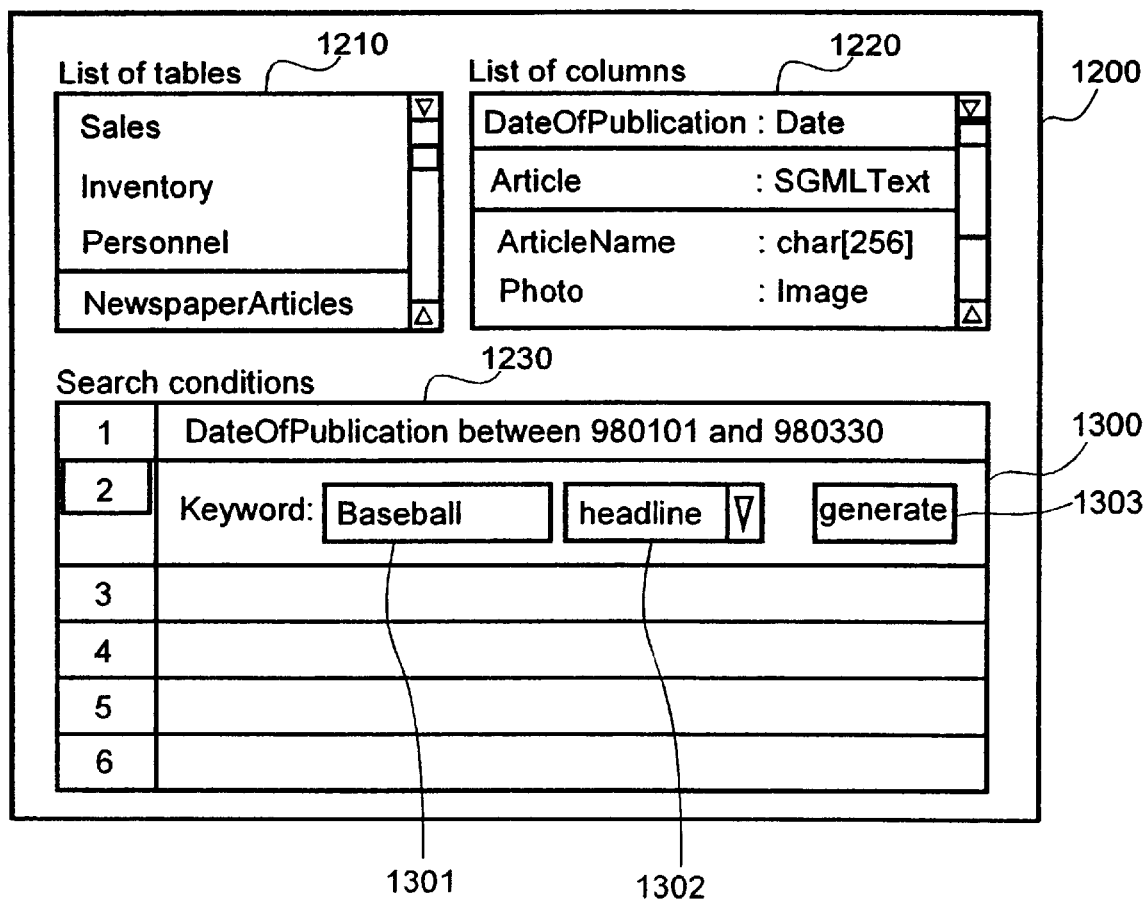
FIG. 11 is a drawing showing an example of a search condition input screen for performing a full text search of a specified structure in an SGMLText type document according to the first embodiment.

FIG. 11 shows a sample search condition input screen according to this embodiment used to perform a full-text search of a specified structure in an SGMLText type document. The figure shows the result of having the "Simple" query component activated by the input field 1300. The search condition input screen is used to perform full-text searches of specified structures in an SGMLText type document.

A search field 1301 is the field in which a string to be searched during the full-text search is inputted. The query user has inputted the string "Baseball" (step 801 from FIG. 7).

A document structure list field 1302 is a list of document structures stored under the "article" row. In the "Simple" query component, document structure information is obtained from the database and edited and displayed as a pull-down menu. The query user has selected "headline" (step 801 from FIG. 7).

A query statement generation button 1303 is a button used to generate a query statement based on the inputted search conditions. When the query statement generation button 1303 is pressed, a query statement is generated from the inputted information (step 802 from FIG. 7), and then the screen shown in FIG. 12 is displayed.

Figure 12:
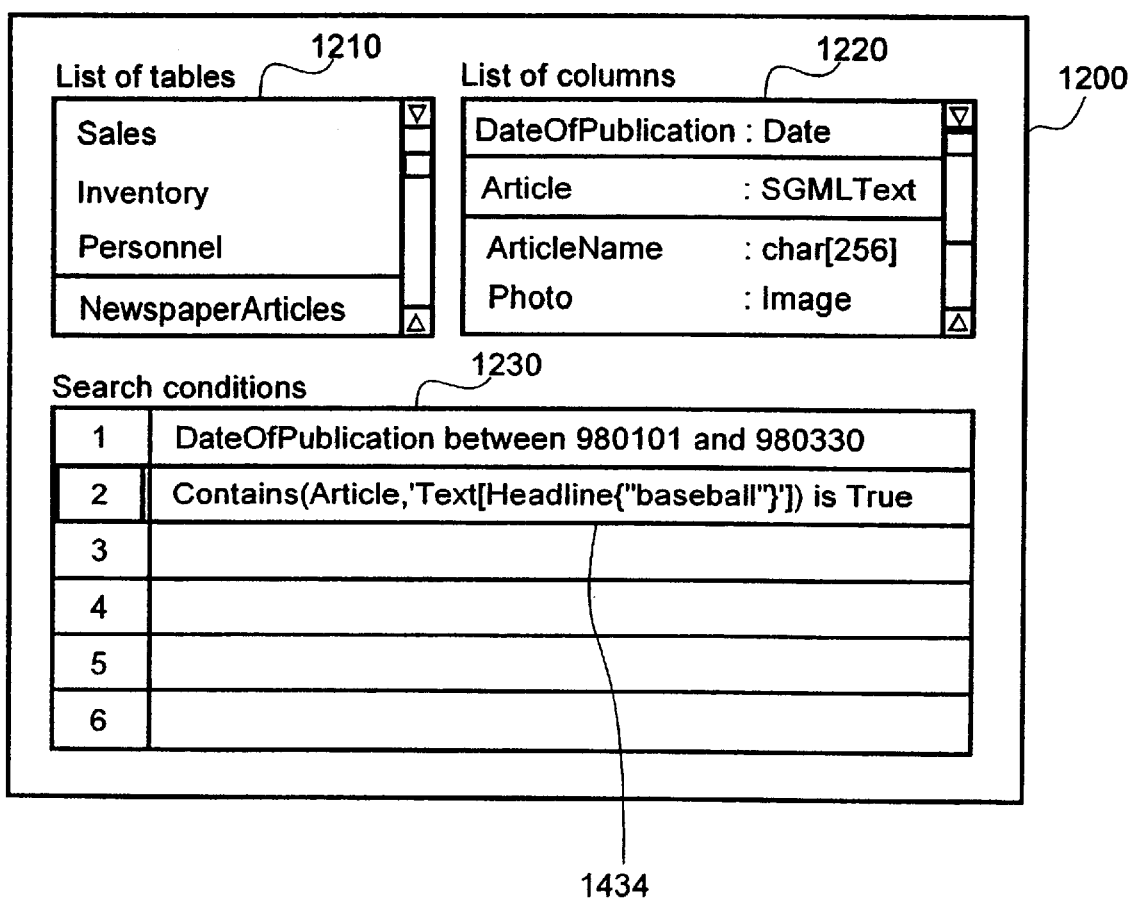
FIG. 12 is a drawing showing an example of a search condition input screen after a conditional expression is generated according to the first embodiment.

FIG. 12 is a drawing showing an example from this embodiment of a search condition input screen after the query statement is generated.

A conditional expression field 1434 is a field displaying the query statement generated by the "Simple" query component. The query statement displayed in the search condition input field 1230 can be combined using logical operators.

Figure 13:
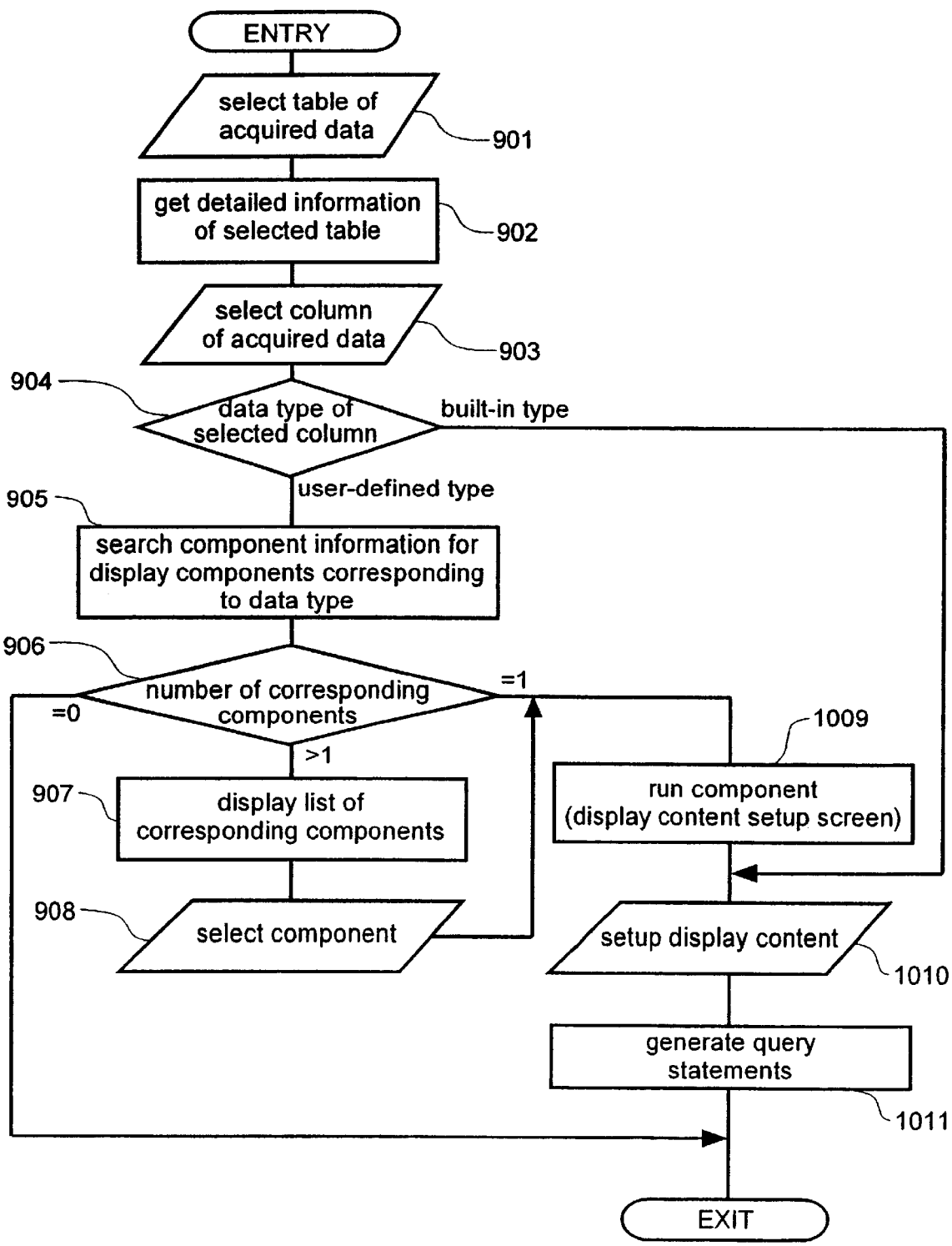
FIG. 13 is a flowchart showing the operations performed in setting up a search results screen at step 804 of FIG. 7 according to the first embodiment.

FIG. 13 shows a flowchart of the operations performed to set up the search results screen from step 804 of FIG. 7 according to this embodiment. The operations performed from step 901 to the step 908 correspond to the operations performed in FIG. 8 by the identically numbered steps. However, at step 904, if the data type is not a user-defined type control jumps to step 1010. Also, at step 905, the query components 221 are searched based on whether function category 603 is "search condition input" rather than "display.

At step 1009, since a single component to be used has been determined, the display component is activated and the display contents setup screen provided by the display component is displayed. The query user sets up the manner in which the query results will be displayed (step 1010). Based on the settings made at step 1010, an element of a projection row for the query statement is generated (step 1011).

With the database query device according to this embodiment as described above, if the queried data type is a data type that has been newly added, a query component is activated to provide assistance in entry of the information needed for performing queries. Thus, when new data types are added to the database, queries can be performed in the same manner as with conventional data types even without specialized knowledge about the data type.

(Embodiment 2)

The following is a description of a database query device according to a second embodiment in which query requests are received through the Internet or an intranet.

Figure 14:
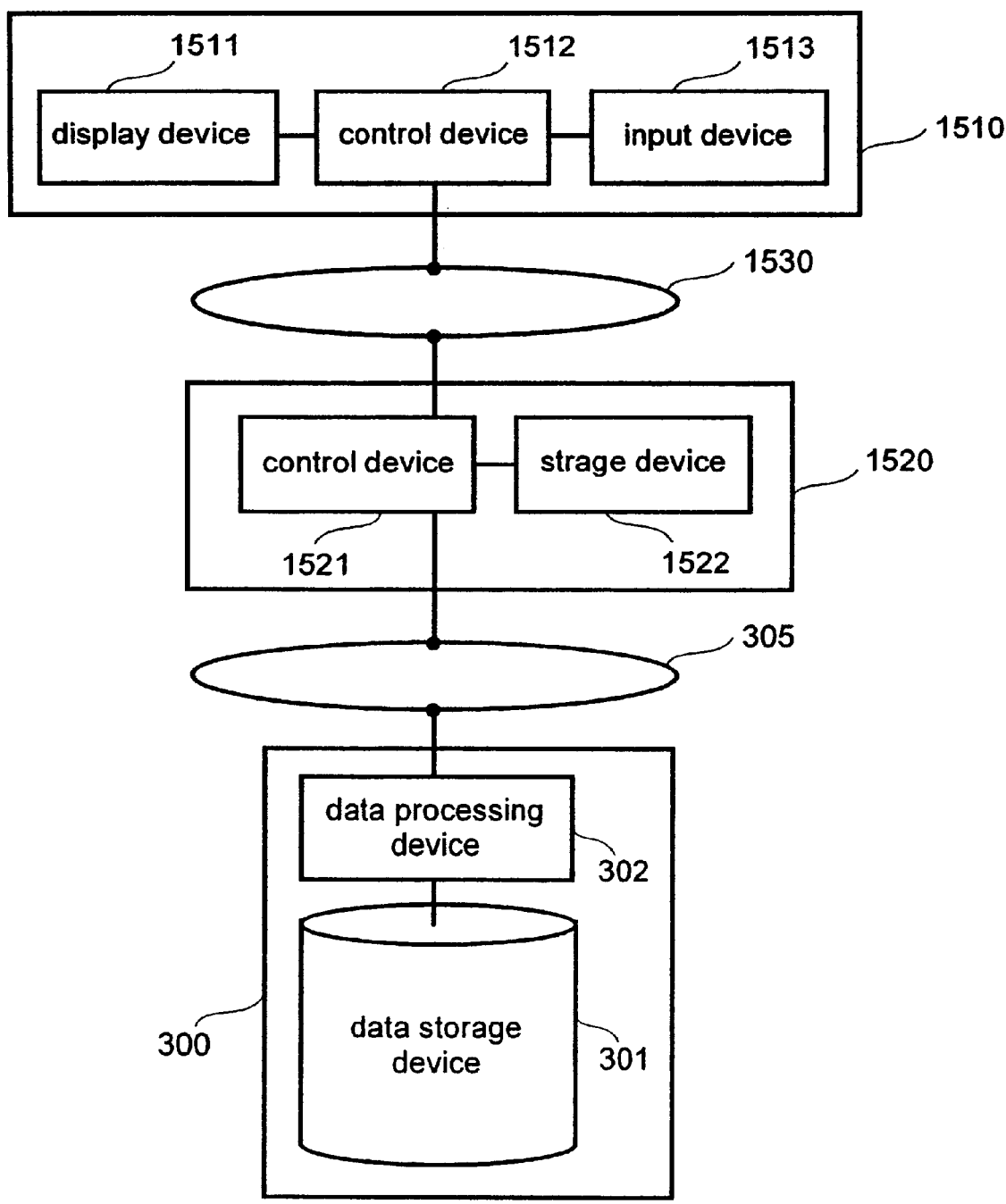
FIG. 14 is a drawing showing the hardware architecture of a database query device according to a second embodiment.

FIG. 14 is a drawing showing the hardware architecture of a database query device according to this embodiment. This architecture implements a query device 1520 using the Internet or an intranet.

The query device 1520 is connected via a network 305 to a database management system 300 which can handle extended data types. A query device 1520 is connected via a network 1530 to a browser running device 1510 on which a web browser is operating. The browser running device 1510 includes a display device 1511 for displaying the browser; an input device 1513 for input to the browser; and a control device 1512 through which the browser is operated.

The query device 1520 includes a storage device 1522 and a control device 1521. The control device 1521 operates a web server, a module for generating HTML (HyperText Markup Language) in conjunction with the web server and other modules, and a module for controlling the operation of the main unit of the query device 1520. The storage device 1522 stores a template files for generating pages as well as query component information 230.

Figure 15:
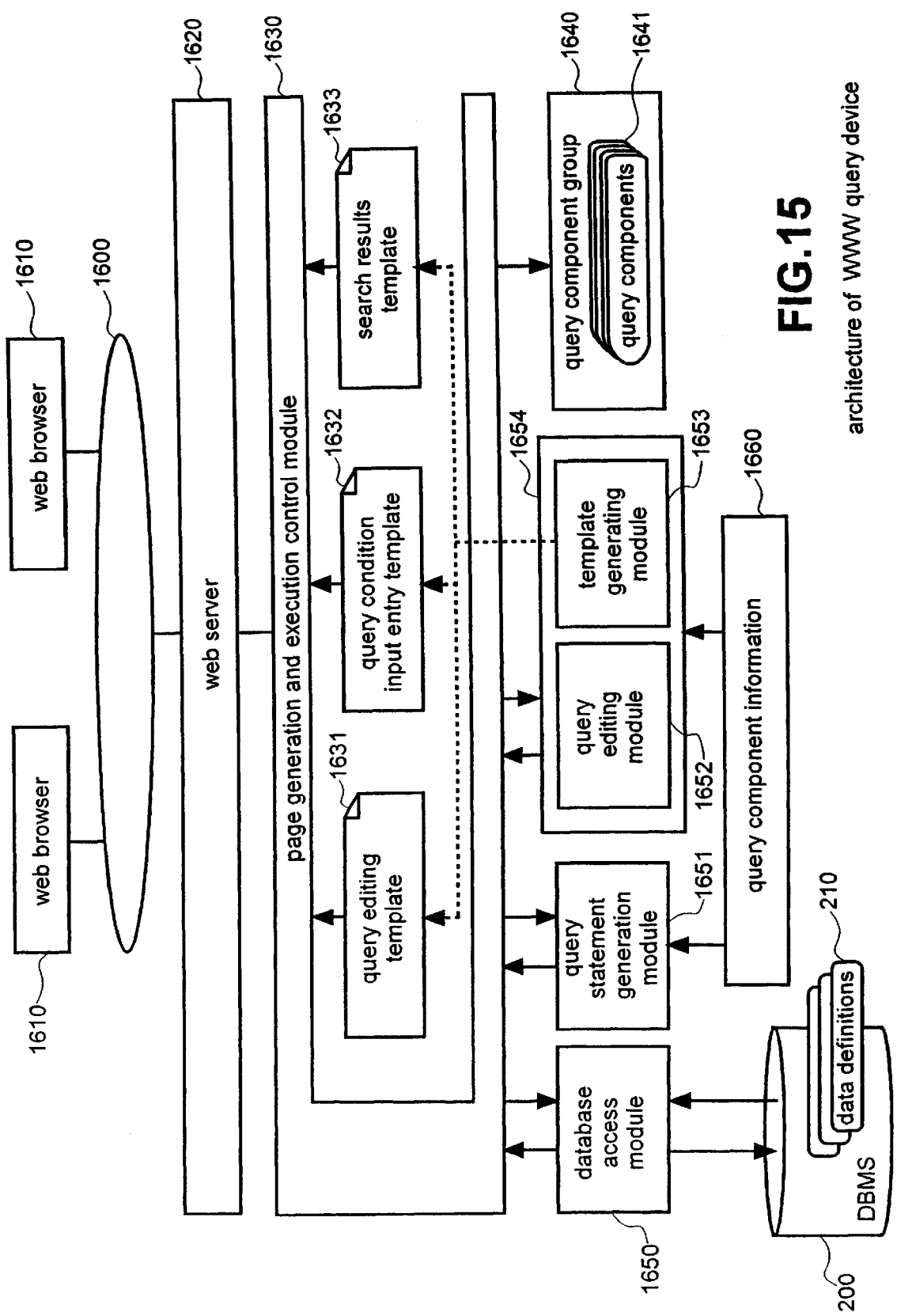
FIG. 15 is a drawing showing the architecture of a query device 1520 that uses the Internet query device.
Figure 16:
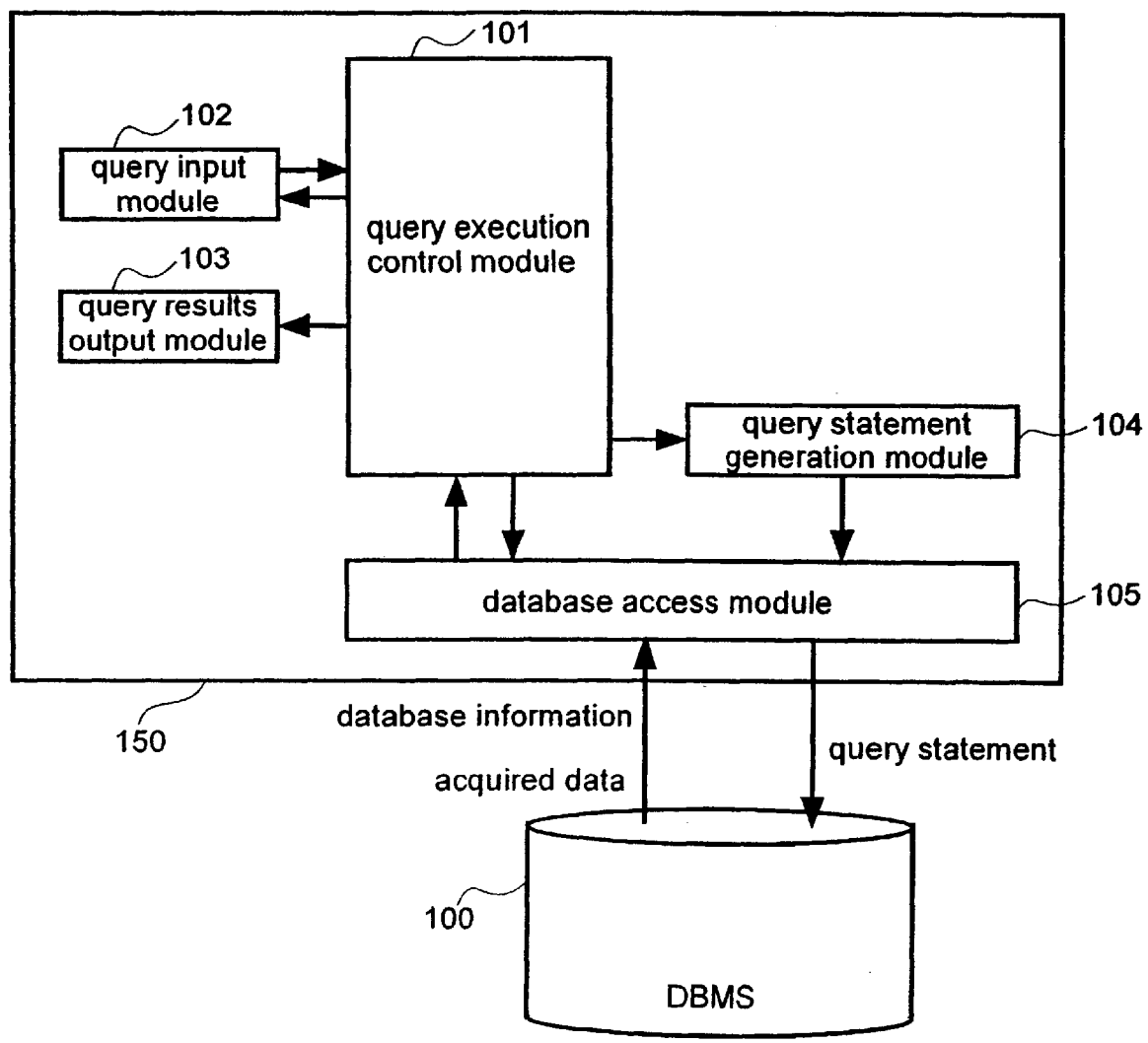
FIG. 16 is a drawing showing the architecture of a conventional query device.

FIG. 15 is a drawing showing the architecture of the query device 1520, which operates via the Internet or intranet 1600. The web browser 1610 displays pages retrieved from the web server 1620 and provides an input interface for issuing commands to the web server 1620.

A page generation and execution control module 1630 reads templates embedded with instructions for controlling page generation and generates page using a page description language such as HTML while executing the embedded commands. The generated page is sent by the web server 1620 to the web browser 1610. The web browser 1610 then displays the page.

A database access module 1620 corresponds to the database access module 205 in FIG. 1, and a query statement generation module 1651 corresponds to the query statement generation module 204 from FIG. 1. These are controlled by the page generation and execution control module 1630 based on the commands contained in the template.

The screen that serves as the basis for query editing operations is described in a query editing template 1631. Based on the commands contained in this template, the page generation and execution control module 1630 activates a query input module 1654, which includes a query editing module 1652 and a template generating module 163, and a query editing page is generated.

The query editing module 1652 of the query input module 1654 refers to the query component information 1660 and searches a query component group 1640 for a query component 1641 matching the input information. The template generating module 1653 generates a search condition input template 1632 and a search results template 1633 that can be activated by the selected query component 1641. The page generating and execution control module 1630 generates a search condition input page and a search results page from these templates.

With the database query device according to this embodiment as described above, if the queried data type is a newly defined data type, a query component is activated to assist in the query of information needed for the query. Thus, when a new data type is added to the database, queries can be performed as with conventional data types even without specialized knowledge regarding the data type.

According to the present invention, if a queried data type is a newly defined data type, a query component is activated to assist in the entry of information needed for the query. Thus, when a new data type is added to the database, queries can be performed as with conventional data types even without specialized knowledge regarding the data type.

What is claimed is:

1. A method for querying a database in which a query statement is issued to a database management system for which a data type can be defined and query results are acquired, said method comprising the steps of:

selecting at least one of query components used to assist queries to the database based on input information;

generating at least one of templates for activating said selected at least one of query components, said templates including a query editing template, a query condition entry template and a search result template;

generating and displaying a page for editing a query based on said generated query editing template;

generating and displaying a page for inputting a search condition based on said generated query condition entry template; and generating and displaying a page for displaying a search result based on said generated search result template.

2. A method for querying a database in which a query statement is issued to a database management system for which a data type can be defined and query results are acquired, said method comprising the steps of:

generating a template for activating a query component used to assist queries to a database in which a new data type has been defined as well as information about said data type;

referring to said template if a queried data type is said newly defined data type;

searching for a query component for assisting querying data belonging to the queried data type;

when the query component for assisting querying belonging to the data type is found, activating said query component to assist querying said data type and generating a page for entry of information needed to query data of said data type and handling entry of said information, based on said generated template; and generating query statement based on said generated template and issuing said generated query statements to said database management system.

\* \* \* \* \*